United States Patent [19]

Mizuno et al.

[11] Patent Number: 4,913,223
[45] Date of Patent: Apr. 3, 1990

[54] APPARATUS FOR DEFREEZING FROZEN FOODS

[75] Inventors: Shigeo Mizuno; Yuji Wakatuki; Nobuya Suzuki, all of Toyoake, Japan

[73] Assignee: Hoshizaki Electric Co., Ltd., Aichi, Japan

[21] Appl. No.: 322,395

[22] Filed: Mar. 13, 1989

Related U.S. Application Data

[63] Continuation-in-part of Ser. No. 132,553, Dec. 14, 1987, abandoned, and Ser. No. 13,421, Feb. 11, 1987, Pat. No. 4,812,622.

[51] Int. Cl.[4] .................. F25B 29/00; H05B 1/02; F24C 15/32
[52] U.S. Cl. .................. 165/61; 165/100; 165/63; 165/64; 165/918; 312/236; 126/21 A; 219/400
[58] Field of Search .............. 165/17, 30, 48.1, 61, 165/63, 64, 903, 918, 919, 100; 312/236; 126/21 A; 219/400

[56] References Cited

U.S. PATENT DOCUMENTS

| | | | |
|---|---|---|---|
| 3,895,215 | 7/1975 | Gordon | 126/21 A |
| 4,002,199 | 1/1977 | Jacobs | 165/61 |
| 4,030,476 | 6/1977 | Hock | 165/60 |
| 4,381,442 | 4/1983 | Guibert | 219/400 |
| 4,482,009 | 11/1984 | Nishimura et al. | 165/100 |
| 4,515,143 | 7/1985 | Jabas | 126/21 A |
| 4,519,443 | 5/1985 | Sutoh et al. | 165/17 |
| 4,779,604 | 10/1988 | Konig | 126/21 A |
| 4,812,622 | 3/1989 | Takeda et al. | 165/64 |

FOREIGN PATENT DOCUMENTS

| 3020374 | 12/1981 | Fed. Rep. of Germany | 126/21 A |
|---|---|---|---|
| 252890 | 10/1948 | Switzerland | 165/61 |

Primary Examiner—John Ford
Attorney, Agent, or Firm—Wenderoth, Lind & Ponack

[57] ABSTRACT

A defrosting apparatus comprises a housing defining therein a frozen food storage space. Within the housing, air is heated and supplied to the storage space through a hot-air entrance passage formed between a side wall of the housing and one of paired shelf receiving members which cooperate to define the storage space. The hot-air entrance passage incorporates a guide plate having a communication aperture provided at a lower end. The guide plate cooperates with the side wall of the housing and one of the shelf receiving members to force the hot air fed from a ventilating fan to flow first downwardly along the hot-air inlet passage. The hot-air flow is then changed in the flow direction upon passing through the communication aperture so as to flow upwardly. In the course of flowing upwardly, the hot air is fed into the storage space successively through a plurality of inlet ports formed in one of the shelf receiving members.

14 Claims, 7 Drawing Sheets

APPARATUS FOR DEFREEZING FROZEN FOODS

CROSS REFERENCE TO RELATED APPLICATIONS

This is a Continuation in Part application of both Ser. No. 07/132,553, filed Dec. 14, 1987, now abandoned entitled APPARATUS FOR DEFREEZING FROZEN FOODS and Ser. No. 07/013,421, filed Feb. 11, 1987, and now U.S. Pat. No. 4,812,622 entitled APPARATUS FOR DEFROSTING FROZEN ARTICLES.

BACKGROUND OF THE INVENTION

1. Field of the Invention

The present invention generally relates to an apparatus for defrosting frozen foods and, more particularly, to improvements in the defrosting apparatus which is capable of defrosting substantially simultaneously a relatively large number of frozen foods of relatively small size as uniformly as possible with a short time.

2. Description of the Prior Art

Figure 6:
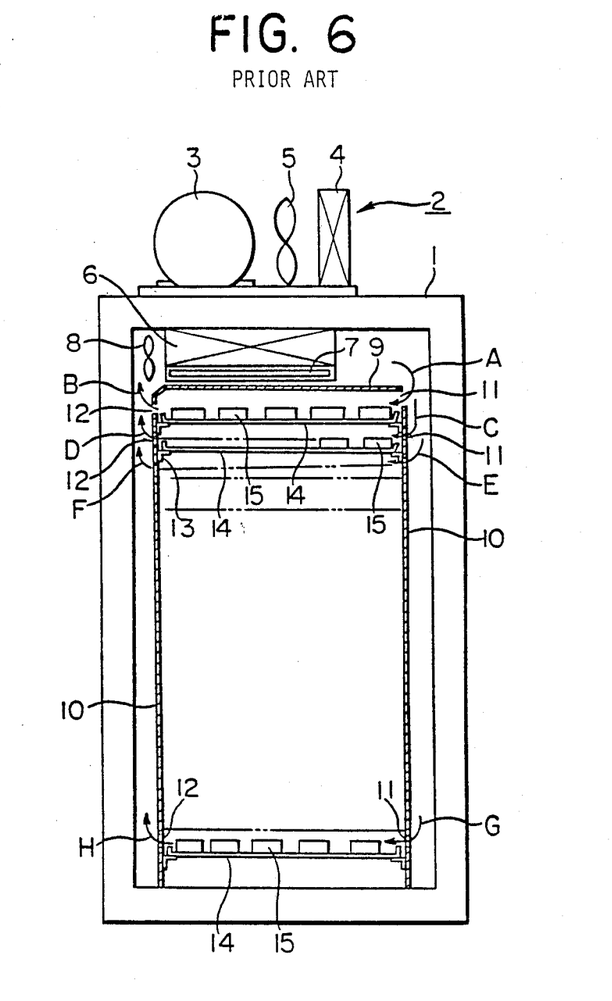
FIG. 6 is a front view similar to FIG. 1 and shows a structure of a prior art defrosting apparatus.
Figure 7:
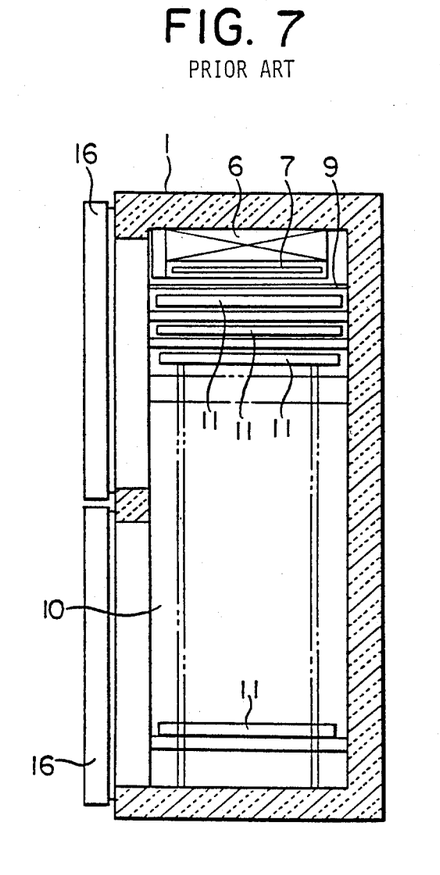
FIG. 7 is a schematic view showing in a vertical section the prior art defrosting apparatus shown in FIG. 6.

Heretofore, in conjunction with the defrosting (or defreezing) of frozen foods, there have been proposed numerous types of defrosting apparatuses having various structures and configurations. FIGS. 6 and 7 of the attached drawings show schematically a typical structure of a hitherto known defrosting apparatus. In these figures, a reference numeral 1 generally denotes a box-like housing of a thermally insulated structure. Mounted on the top surface of this housing 1 are a compressor 3, a condenser 4 and a fan motor 5 which constitute major parts of a refrigerating unit 2. Also, a vaporizer or evaporator 6 also constituting a part of the refrigerating unit 2 is disposed at an upper position within the housing 1. A heating device 7 constituted by an electrical heater or the like is disposed beneath the evaporator 6 with a ventilating fan or blower 8 being mounted to the left of the evaporator 6 and the heater 7.

In the interior of the housing 1, a storage space for storing or accommodating therein frozen foods is defined by a horizontal shield plate 9 disposed below the heating device 7 and a pair of shelf receiving members 10 disposed vertically in opposition to each other and in laterally spaced relationship with the inner side walls of the housing 1. Each of the shelf receiving members 10 is provided with a plurality vertically spaced, L-shaped supporting fixtures 13, and shelves 14 are disposed between the paired shelf receiving members 10 while being supported on the respective supporting fixtures 13. The frozen foods 15 are placed on the shelves 14. A transverse air inlet port 11 is provided between one end of the shield late 9 and one end of the topmost shelf plate 14, while a transverse air outlet port 12 is provided between the other end of the shield plate 9 and the topmost shelf plate 14. Furthermore, openings corresponding to the inlet ports 11 and the outlet ports 12 are also formed in the shelf receiving members 10 between the adjacent shelves 14, these openings being denoted by the same reference numerals as the ports mentioned above, as will be seen in FIG. 7 (in which only the inlet ports or openings 11 are visible). The frozen foods 15 on the shelf plates 14 can be taken out from the housing 1 by opening a door(s) 16 mounted pivotally on the housing.

In operation, when the heating device 7 is activated simultaneously with the ventilating fan 8, the air within the housing 1 is first heated by the heating device 7, and the hot air resulting from the heating is forced to flow along paths indicated by arrows A, C, E and G through operation of the ventilating fan 8. More specifically, the hot air flows into the storage space through the air inlet ports or openings 11 mentioned above, and heat exchange takes place between the hot air and the frozen foods 15 on shelves 14 within the storage space. Thereafter, the air is expelled from the storage space through the outlet ports 12 as indicated by arrows B, D, F and H to be fed back toward the ventilating fan 8 for subsequent recirculation within the housing 1 in the manner described above.

In the prior art defrosting apparatus of the type described above, results of actually performed measurement of the hot-air temperature at the positions corresponding to the individual air inlet ports or openings 11 show that the temperature of the hot air becomes higher the higher the air inlet port is positioned, because high temperature air naturally exhibits a tendency to rise higher than low temperature air. Consequently, a longer time is required for defrosting the frozen foods placed on the lower shelves when compared with those positioned on the higher shelves, resulting in remarkable non-uniformity in the degree of defrosting among the foods to be defrozen. Under these circumstances, it was either necessary to put up with such non-uniformity in the defrosted state among the foods or alternatively to extend duration of the defrosting operation until the frozen foods placed on the lowermost shelf have been defrosted.

The defrosting apparatus can be operated as a cooling or refrigerating apparatus by causing a liquid coolant to flow through the evaporator 6 after the completion of the defrosting operation. In this case, when the defrosting period is extended for the reason mentioned above, the foods placed on the shelf of high level or position which are naturally defrosted earlier than those placed on the lower shelves would be rid of moisture, allowing surface fading or discoloration just about the time the foods on the lower shelf have been completely defrosted. It goes without saying that such faded or discolored foods are significantly reduced in commercial values.

Further, in the case where a relatively small amount of food is stored in the housing 1, there may be regions on the shelfs located along the flow path of the circulating hot air in which there are no foods to be defrosted. In that case, the hot air is fed back to the ventilating fan 8 through the associated outlet port 12 without undergoing heat exchange, which brings about the following. Namely, some defrosting apparatuses of the type described above are equipped with a temperature sensor on the air-intake side of the ventilating fan 8 for the purpose of determining the point in time at which the defrosting operation is to be terminated. When a predetermined temperature is detected by the sensor, a defrosting operation terminating signal is generated. Accordingly, when the situation mentioned above takes place in this type of defrosting apparatus, the sensor may detect the temperature of the hot air which has not undergone heat exchange with any foods, whereby a defrost inhibit signal would be produced to trigger the succeeding cooling or refrigerating operation notwithstanding the the fact that the frozen foods have not yet been satisfactorily defrosted. This means that a great difficulty is encountered in performing the automatic defrosting operation for a small amount of frozen foods.

SUMMARY OF THE INVENTION

Accordingly, it is an object of the present invention to provide a defrosting apparatus in which frozen foods on all the shelves can be brought into contact with hot air of essentially uniform temperature so that all the foods can be defrozen satisfactorily within a substantially constant time.

Another object of the present invention is to provide a defrosting apparatus capable of defrosting all frozen foods within a substantially constant time even when there is only a small amount of foods to be defrosted.

According to one aspect of the present invention, an apparatus for defrosting frozen foods is provided, which comprises a housing constituted by an enclosing wall structure and defining inside of the wall structure a storage space for storing therein the frozen foods, the storage space including an access opening for allowing the foods to be put in and taken out of the storage space, a plurality of hot air inlet ports and a plurality of hot air outlet ports, the housing having a door for opening and closing the access opening, and further comprises heater means disposed at an upper position within the storage space for heating the air within the housing, ventilating means disposed within the housing for circulating the hot air resulting from the heating by the heater means throughout the storage space, inlet passage defining means which, along with the wall structure of the housing, define a hot-air inlet passage for introducing the hot air supplied from the ventilating means to the hot-air inlet ports, outlet passage defining means which cooperates with the wall structure of the case to define a hot-air outlet passage for introducing the air discharged through the outlet ports to the heater means, wherein the inlet passage defining means includes a guide plate disposed between the storage space and the wall structure of the housing and having an upper end secured to the storage space in a substantially hermetic manner, the guide plate having a communication aperture provided at a lower end thereof, a down-draft passage for the hot air defined between the guide plate and the housing for allowing the hot air fed from the ventilating means to flow therethrough, and an up-draft passage for the hot air defined between the guide plate and the storage space and communicated with the down-draft passage through the communication aperture, whereby the hot air is caused to flow into the storage space through the plurality of the hot-air inlet ports successively while being introduced through the upper-draft passage.

According to another aspect of the present invention, there is provided an apparatus for defrosting frozen foods, which comprises a housing constituted by an enclosing wall structure and defining inside of the wall structure a storage space for storing therein the frozen foods, the storage space including an access opening for allowing the foods to be put in and taken out of the storage space, a plurality of hot air inlet ports and a plurality of hot air outlet ports, the housing having a door for opening and closing the access opening, and further comprises heater means disposed at an upper position in the storage space for heating the air within the housing, ventilating means disposed within the housing for circulating the hot air resulting from the heating by the heater means throughout the storage space, inlet passage defining means which, along with the wall structure of the housing, define a hot-air inlet passage for introducing the hot air supplied from the ventilating means to the hot-air inlet ports, outlet passage defining means which cooperates with the wall structure of the housing to define a hot-air outlet passage for introducing the hot air discharged through the outlet ports to the heater means, wherein the inlet port defining means includes a first guide plate disposed between the storage space and the wall structure of the housing and having a free upper end and a lower end provided with a communication aperture, a partition wall mounted between the first guide plate and the storage space in a hermetical manner for partitioning a vertical space between the first guide plate and the storage space into upper and lower passage sections, and a second guide plate disposed vertically within the upper passage section being coupled in a fluidtight manner to the storage space at an upper end and having a lower end provided with a second communication aperture, whereby a down-draft passage is defined between the first guide plate and the housing, while an up-draft passage for the hot air is defined below the partitioning plate between the first guide plate and the storage space and communicated with the down-draft passage through the first communication aperture, and wherein an upper down-draft passage portion is defined above the partitioning plate between the first and second guide plates with an upper up-draft passage portion being defined above the partitioning plate between the second guide plate and the storage space, the upper down-draft passage portion and the upper up-draft passage portion being communicated with each other through the second communication aperture, whereby the hot air is caused to flow along the up-draft passage and/or the upper up-draft passage portion separately while being introduced into the storage space through the plurality of hot-air inlet ports successively.

By the arrangement in which the hot air can be introduced into the storage space separately along the up-draft passage and/or upper up-draft passage portion, even a small amount of frozen foods can be satisfactorily defrosted by simply placing them in a region of the storage space which is associated with the up-draft passage or the upper up-draft passage portion and supplying the hot air only to that region.

BRIEF DESCRIPTION OF THE DRAWINGS

For a better understanding of the present invention, reference may be had to the accompanying drawings, in which.

DESCRIPTION OF THE PREFERRED EMBODIMENTS

Now, the present invention will be described in detail in conjunction with preferred and exemplary embodiments of the frozen-food defrosting apparatus by referring to the accompanying drawings, in which like or corresponding parts are designated by like reference symbols.

Figure 1:
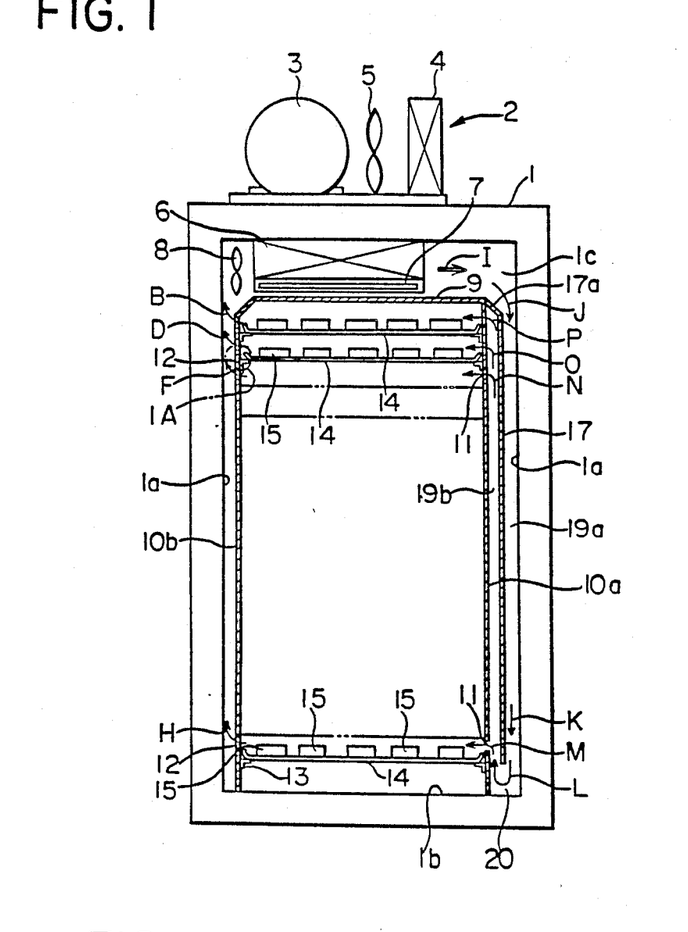
FIG. 1 is a front view showing partially in section a defrosting apparatus according to an exemplary embodiment of the invention with the doors being removed.
Figure 1A:
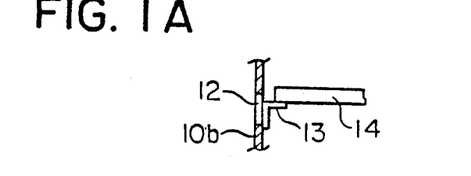
FIG. 1A is an enlarged sectional view of a region 1A encircled by a broken line in FIG. 1.
Figure 2:
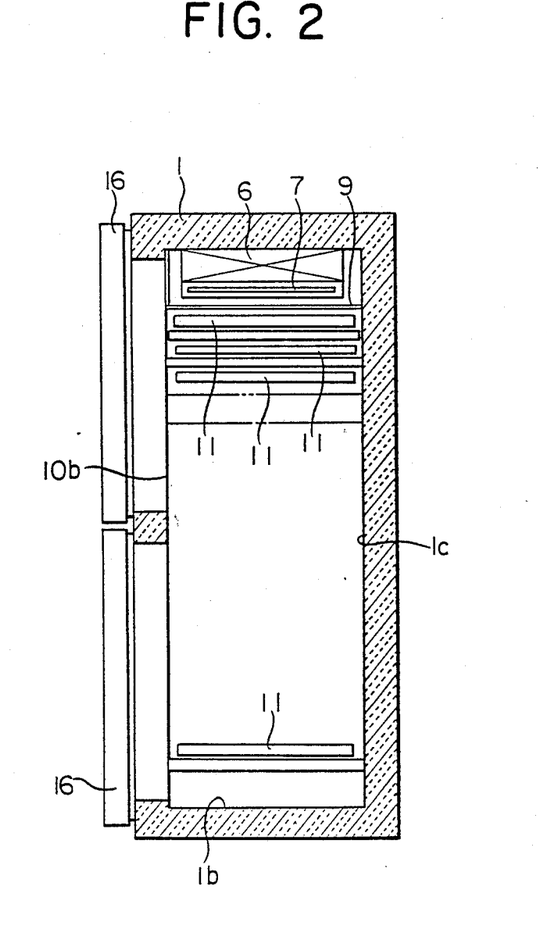
FIG. 2 is a vertical sectional view showing schematically the defrosting apparatus shown in FIG. 1.

Referring to FIGS. 1, 1A and 2, there is shown a first exemplary embodiment of the defrosting apparatus according to the present invention, wherein a reference numeral 1 generally denotes a housing of a thermally insulated box-like structure having a top surface on which mounted are mounted a compressor 3, a condenser 4 and a fan motor 5 which constitute major parts of a refrigerating unit denoted generally by a reference numeral 2. Further, a vaporizer or evaporator 6 constituting the refrigerating unit 2 in cooperation with the abovementioned components 3, 4 and 5 is disposed within the housing 1 at a top portion thereof. A heater unit 7 which may be an electrical heater or the like is mounted at a location beneath the evaporator 6. Furthermore, in the housing of the illustrated embodiment, three ventilating fans 8 are disposed on the left side of the evaporator 6 and the heater unit 7.

A storage space for storing or accommodating therein frozen foods is defined within the housing 1 by a shield plate 9, disposed substantially horizontally below the heater unit 7, in cooperation with a pair of shelf receiving members 10a and 10b which are vertically disposed in opposition to each other at a distance from respective side walls 1a of the housing 1 and extend downwardly to a bottom wall 1b thereof, and a rear wall 1c of the housing 1. Each of the shelf receiving members 10a and 10b is provided with a plurality of L-shaped supporting fixtures 13 with an appropriate distance therebetween, as will be best seen in FIG. 1A. Each of shelf plates 14 is adapted to be supported in a horizontal orientation on the associated pair of supporting fixtures 13 between the shelf receiving members 10a and 10b. In this manner, the storage space is divided in the vertical direction into a number of compartments which define, respectively, defrosting chambers of a small volume, wherein the frozen foods 15 are placed on the shelf plate 14 within each of the defrosting compartments. The shelf receiving member 10a located on the air inlet side of the storage space is provided with a transverse air inlet port 11 which extends transversely between one end of the shield plate 9 and that of the uppermost shelf plate 14, while the shelf receiving member 10b located on the air exit side is provided with a transverse air outlet port 12 which extends transversely between the other end of the shield plate 9 and that of the uppermost shelf plate 14. Furthermore, openings corresponding to the air inlet port 11 and the air outlet port 12 mentioned above are formed in the shelf receiving members 10a and 10b at positions between the adjacent shelf plates 14, respectively, as will be best seen in FIG. 2 in which the openings corresponding to the air entrance port 11 are shown representatively, being designated by the same reference numeral 11. In the case of the illustrated embodiment, two doors, i.e. upper and lower doors generally denoted by a numeral 16 are pivotally mounted on the housing 1 so that the food 15 resting on the shelf plates 14 can be removed from the housing 1 opening the corresponding door 16.

Further, mounted between the shelf receiving member 10a located on the air entrance side and the adjacent side wall 1a of the housing 1 is a solid guide plate 17 which extends downwardly from the one end of the shield plate 9 substantially in the vertical direction, wherein the guide plate 17 serves to define an air down-draft passage or duct 19a and an air up-draft passage or duct 19b between the shelf receiving member 10a and the adjacent side or lateral wall 1a of the housing 1, respectively. The guide plate 17 has a top end portion 17a which is connected in an airtight manner to the shield plate 9 at one end thereof, while the bottom end portion of the guide plate 17 is not connected to the bottom wall 1b of the housing 1 but spaced therefrom to form an air communication aperture so that both the ducts or passages 19a and 19b are in fluid communication with each other through an air flow reversing section 20 defined by the abovementioned air communication aperture.

In the defrosting operation, the heater unit 7 is activated with the ventilating fan 8 being simultaneously actuated. The hot air resulting from the heating by the heater unit 7 is forced to flow in the direction indicated by arrows I and J by the ventilating fan or blower 8 to pass through the passage 19a downwardly, as indicated by an arrow K toward the air flow reversing section 20, whereupon the flowing direction of hot air is changed over to the upward direction through the passage 19b. In the course of flowing upwardly through the passage 19b, the hot air flow branches into streams entering the defrosting compartments through the air inlet ports 11 successively starting from the lowermost one, as indicated by arrows M, N, O and P, resulting in that the frozen articles 15 disposed on the shelf plates 14 within the defrosting compartments are defrosted through heat-exchange with the hot air streams. After having undergone the heat-exchange process, the air is discharged through the air outlet ports or openings 12, as indicated by arrows B, D, F and H to flow back to the ventilating fan or blower 8 to be circulated repeatedly within the housing 1 in the manner described above.

As will be readily understood, the hot air stream entering a given one of the compartments has a higher temperature as that given compartment is located lower within the storage space. However, since the hot air within the passage 19b naturally has a tendency to rise up, balance is established between the temperature of the hot air and the flow of circulation. Thus, when the hot air circulating operation described above has been continued for a predetermined time, substantially uniform temperature distribution can be established among the food articles 15 on all the shelf plates, whereby all the foods can be defrosted substantially uniformly within an essentially identical defrosting period.

In connection with the detection of the completely defrosted state, it should be mentioned that the time determined empirically for defrosting the frozen foods may be set by a timer, wherein upon lapse of the set time the defrosting operation may be regarded as having been completed, because all the frozen articles can be defrosted within substantially the same time according to the present invention, as described above. Alternatively, the temperature prevailing on the intake side of the blower fan may be utilized for detecting of determining the completely defrosted state of all the articles. After the defrosting operation, the foods can of course be stored as chilled foods in a refrigerating environment by starting the operation of the refrigerating unit.

Figure 3:
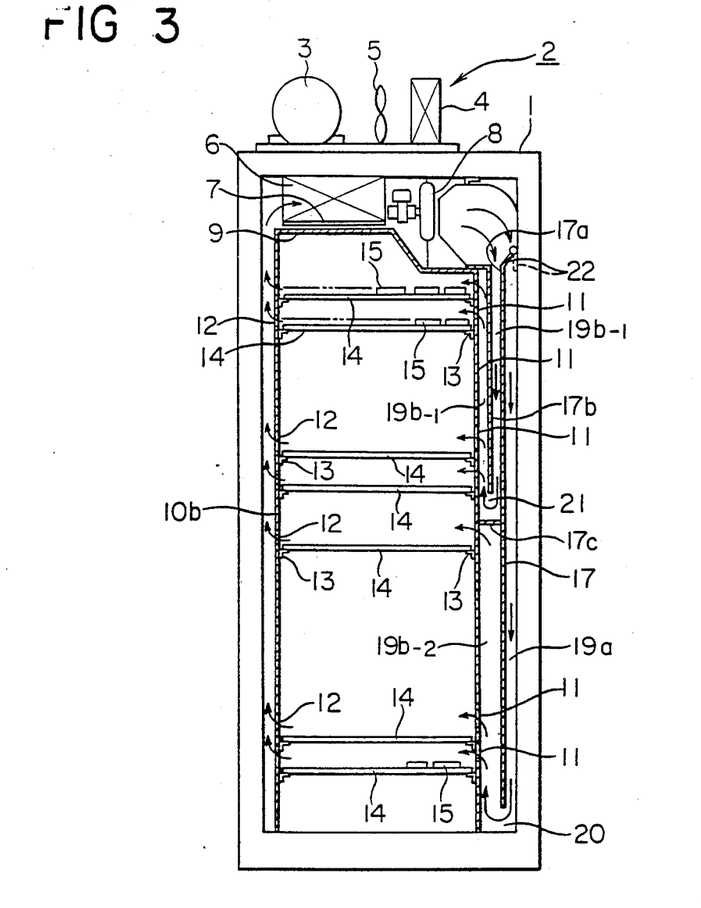
FIG. 3 is a front view showing a defrosting apparatus according to another embodiment of the present invention.

FIG. 3 shows a defrosting apparatus according to a second embodiment of the present invention which differs from the preceding embodiment in that the ventilating fan 8 is so disposed as to suck the air from the side facing the evaporator 6 and discharges the air into the duct or passage 19b and in that the passage 19b is partitioned into an upper passage section 19b-1 and a lower passage section 19b-2 by a transverse partition wall or plate 17c. The upper passage section 19b-1 is further divided into two sub-passage portions by a second vertical guide plate 17b, which has an upper end portion connected in a fluidtight manner to the shield plate 9 of an offset configuration at one end thereof and the lower end is spaced from the transverse partition plate 17c. Furthermore, the first guide plate 17 has an upper end 17a which is not connected to the shield plate 9 and is adapted to cooperate with a shutter blade or plate 22 mounted pivotally on the lateral side wall 1a of the housing 1 in such a manner that when the shutter blade member 22 is at a position indicated by a broken line in FIG. 3, the hot air discharged from the ventilating fan 8 is introduced into both passages 19a and 19b while the hot air is forced into only the passage section 19b-1 when the shutter blade member 22 assumes the position indicated by a solid line in FIG. 3.

Figure 3A:
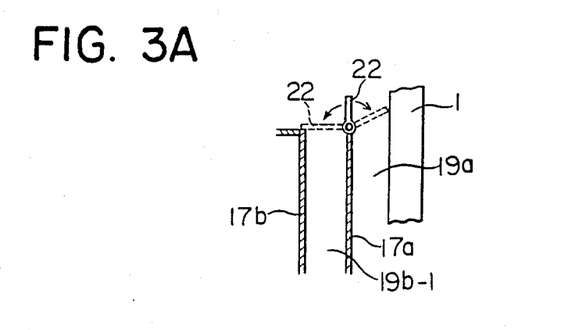
FIG. 3A is a partially enlarged sectional view illustrating another mode for mounting the shutter plate in the defrosting apparatus shown in FIG. 3.

Referring to FIG. 3A, the shutter blade member 22 may be alternatively mounted pivotally on the first guide plate 17 at the top end 17a rather than the side wall of the housing 1. In this case, when the shutter blade member 22 is at a position indicated by a solid line in FIG. 3A, the hot air from the ventilating fan 8 is guided into both passages 19a and 19b. On the other hand, when the shutter blade 22 is rotated clockwise or alternatively counterclockwise, the hot air is introduced into only the passage section 19b-1 or alternatively into both the passage 19a and the passage portion 19b-2.

Parenthetically, it will be noted that when the shutter blade member 22 is at the broken-line position shown in FIG. 3 or at the solid-line position shown in FIG. 3A, the hot air is fed to all the passages. As will be readily appreciated, this situation corresponds to the case where there is no shutter blade member 22.

In operation of the defrosting apparatus shown in FIG. 3, the hot air flows into all the passages when the shutter blade member 22 is at the broken-line position. The hot air fed into the passage 19a flows downwardly therethrough and is reversed in the flow direction at the bottom section 20, continuing to flow upwardly through the passage section 19b-2 up to the partition plate 17c to enter the storage space through the inlet ports 11 formed in the shelf receiving member 10a, whereby the frozen foods 15 located in the lower region of the storage space are defrosted. On the other hand, the hot air fed into the upper passage section 19b-1 flows downwardly through the outer sub-passage to reach the flow direction reversing port 21, where the flow direction is reversed. The hot air then continues to flow upwardly through the inner sub-passage portion, finally entering the storage space through the hot air inlet ports 11 to defrost the frozen food articles 15 located in the upper region thereof. By the arrangement in which the hot air is supplied to the different regions within the storage space of the housing 1 through the separate passages in the manner described above, the temperatures at the various regions within the storage space can be made more satisfactorily uniform as compared with the preceding embodiment, whereby more uniform defrosting can be accomplished for all of the frozen foods placed on all the shelf plates 14 as a whole.

When the shutter blade member 22 is changed over to the solid-line position shown in FIG. 3 or alternatively to the phantom-line position shown in FIG. 3A, the hot air can be supplied only to the passage section 19b-1 or alternatively 19b-2. Accordingly, when a relatively small amount of frozen food is to be defrosted, the defrosting operation can be accomplished reliably within a short time by plating collectively the frozon articles in the upper or lower region of the storage space within the housing 1 and manipulating the shutter blade member 22 so that the hot air can be supplied only to the selected region where the frozen food articles are present.

Figure 4:
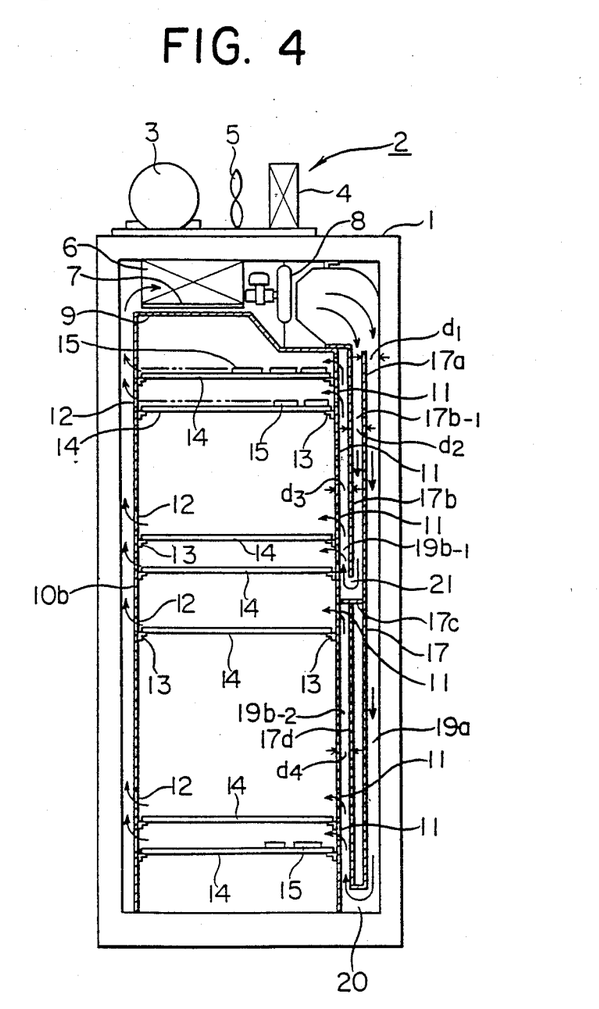
FIG. 4 is a front view showing defrosting apparatus according to still another embodiment of the invention.

FIG. 4 shows a third embodiment of the defrosting apparatus according to the present invention, which embodiment differs from the second one in that the shutter blade member 22 is not incorporated and that a spacer 17d is provided for the lower passage section 19b-2 between the shelf receiving member 10a and the lower portion of the first guide plate 17. In the case of this illustrated embodiment, the spacer 17d is in the form of an L-shape plate having an upper end and a lower end secured integrally to the lower end of the first guide plate 17 and the partition plate 17c. Due to the provision of this spacer 17d, the transverse dimensions $d_1$, $d_2$, $d_3$ and $d_4$ of the passage portions can be made substantially equal to one another, whereby the temperature distribution brought about by the hot air supplied to the lower and upper regions in the storage space from the lower and upper passage sections can be much more uniform, whereby a more uniform defrosting can be realized.

Figure 5:
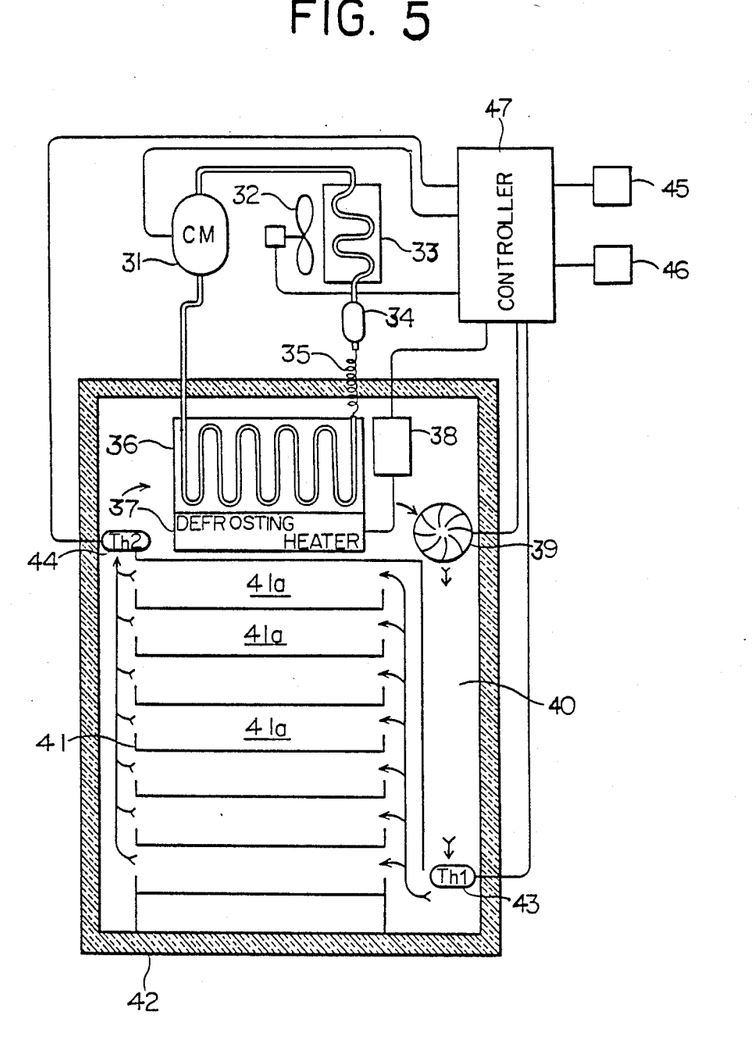
FIG. 5 is a somewhat schematic front view, partially in cross section, showing a defrosting apparatus according to a still further embodiment of the invention.

Referring to FIG. 5 there is shown schematically a fourth embodiment of the combined defrosting and refrigerating apparatus embodying the invention, wherein reference numeral 42 denotes a box-like housing essentially made of a heat insulating material. A defrosting heater 37 and an intra-box air circulation fan 39 (i.e. fan circulating the air within the box-like housing) are provided within the box-like housing 42. Upon operation of the intra-box air circulation fan 39, the latter causes an air flow to be created through a duct 40 and spaces 41a defined between shelves 41 and which circulates as indicated by arrows. Disposed at an appropriate location (hereinafter referred to as an outlet port) within the duct 40 located on the discharge side of the air circulation fan 39 is a temperature sensor (Th1) 43 for detecting the air temperature at the outlet port, while there is disposed on the air exit side of the space 41a and preferably above the uppermost shelf 41, i.e. on the suction side of the air circulation fan 39 (hereinafter referred to as the inlet port) a temperature sensor (Th2) 44 for detecting the air temperature in the inlet port, wherein both of the temperature sensors 43 and 44 are electrically connected to a control circuit 47 also referred to as a controller.

Mounted fixedly in a conventional manner above the topmost shelf within the box-like housing 42 is an evaporator 36 which is connected to a compressor 31, a condenser 33, a dryer 34 and a capillary tube 35 in the manner shown in FIG. 5 to thereby constitute a cooling system of a known arrangement. Reference numeral 32 denotes a cooling fan for the condenser 33. The aforementioned defrosting heater 37 is disposed between the evaporator 36 and the uppermost shelf 41 and is connected to a thermostat 38 provided for the purpose of protecting the defrosting heater 37. The compressor 31, the defrosting heater 37 and the protecting thermostat 38 mentioned above are also connected electrically to the controller 47.

Further connected to the controller 47 are a defrosting start switch 45 serving for changing back and forth between the refrigerating mode and the defrosting mode as will be described hereinafter and a defrosting mode indicator lamp 46 which is lit during the defrosting operation mode. The control circuit or controller 47 is so arranged as to respond to the signals supplied from the outlet air temperature sensor 43 and the inlet air temperature sensor 44 for controlling the defrosting and refrigerating operations by supplying appropriate control signals to the compressor 31, cooling fan 32, defrosting heater 37, the intra-box air circulation fan 39 and others.

In the case of the illustrated fourth embodiment, the defrosting start switch 45 is constituted by a momentary type push-button switch which can be closed by being depressed by a user while opened when the switch is released. It should however be noted that the controller 47 remains in the defrosting operation mode once the defrosting start switch 45 is pushed even when the switch is subsequently released. Thus, the defrosting mode indicator lamp 46 continues to be lit, indicating that the apparatus is in the defrosting mode. At the end of the defrosting operation, the control circuit 47 is automatically changed over to the refrigerating mode.

Next, operation of the apparatus will be described in detail with reference to FIG. 5. In the refrigerating operation mode, the combined defrosting and refrigerating apparatus shown in FIG. 5 operates as a refrigerator while operating as a defroster or thawing machine in the defrosting operation mode. In the refrigerating operation mode, the air cooled down through heat exchange with the evaporator 36 of the cooling system is discharged from the intra-box circulation fan 39 into the interior space within the housing though the duct 40 to cool foods and the like disposed on the shelves 41 and then fed back to the evaporator 36 through the inlet port. In this refrigerating operation mode, the controller 47 responds to the signal supplied from the temperature sensor 44 mounted at the inlet port for turning on and off the compressor 31 and the cooling fan 32 so that the interior temperature within the housing can be maintained at a temperature level within a predetermined range of temperature.

The control process and controller 47 is described more specifically in parent application No. 07/013,421, filed Feb. 11, 1987, assigned U.S. Pat. No. 4,812,622, and incorporated herein by reference.

According to the present invention, the defrosting heater 37 is proportionally controlled during the defrosting operation so that the outlet air temperature detected by the temperature sensor 43 mounted at the discharge port of the air circulation fan 39 is maintained to be constant for defrosting the articles disposed on the shelves within the housing, as described hereinbefore. For having a better understanding of this control operation, the control performed for maintaining the outlet air temperature to be constant is described comparatively with the hitherto known apparatus in which such control is not carried out, in parent application No. 07/013,421, as discussed in the paragraph immediately above.

It will be appreciated by those skilled in the art that the embodiments of the invention shown and described above are presented by way of illustration only. For example, in the disclosed embodiments, the hot air can be supplied to different regions within the storage space through both or one of the two passage sections. However, such an arrangement may also be adopted in which the hot air supply is made through three of more passage sections arrayed longitudinally. Further, although the flow-arrayed direction reversing port is formed by separating the lower end of the guide plate from the bottom wall of the housing or partition plate, a similar effect can be obtained even when an opening for air flow communication is formed in the guide plate itself.

What is claimed is:

1. An apparatus for defrosting frozen foods comprising:
    a housing having a housing wall structure;
    an enclosing wall structure located inside of and spaced from said housing and defining inside of said enclosing wall structure a storage space for storing frozen foods therein;
    an access opening in said housing for allowing frozen foods to be put in and taken out of the storage space defined by said enclosing wall structure;
    a plurality of hot-air inlet ports and a plurality of hot-air outlet ports in said enclosing wall structure for fluidly communicating the inside and the outside of the storage space defined by said enclosing wall structure;
    a door attached to said housing for opening and closing said access opening;
    heater means disposed at an upper part of said housing for heating the air within said housing;
    ventilating means disposed within said housing for circulating the hot air resulting from the heating by said heater means throughout said storage space;
    inlet passage defining means for defining a hot-air inlet passage in cooperation with said housing wall structure of said housing for introducing hot air supplied from said ventilating means into said hot-air inlet ports therethrough;
    outlet passage defining means for defining a hot-air outlet passage in cooperation with said housing wall structure of said housing for introducing hot air discharged from said hot-air outlet ports therethrough to said heater means;
    said inlet passage defining means including a first guide plate disposed between said enclosing wall structure defining the storage space and said housing wall structure, said first guide plate having a free upper end and a lower end having a first communication aperture therethrough, a partition wall mounted substantially transversely between said first guide plate and said enclosing wall structure defining the storage space in a substantially hermetic manner, said partition wall partitioning a vertical space between said first guide plate and said enclosing wall structure defining the storage space into upper and lower inlet passage sections, a second guide plate disposed within the upper passage section and connected to said enclosing wall structure defining the storage space at an upper end thereof in a substantially hermetic manner and having a lower end provided with a second communication aperture, and the upper inlet passage section being partitioned vertically by said second guide plate;

a down-draft passage for the hot air circulated by said ventilating means being defined between said first guide plate and said housing wall structure of said housing;

an up-draft passage for the hot air being defined below said partition wall and between said first guide plate and said enclosing wall structure defining the storage space, said up-draft passage being in communication with said down-draft passage through said first communication aperture;

an upper down-draft passage portion defined above said partition wall and between said first and second guide plates; and an upper up-draft passage portion defined above said partition wall and between said second guide plate and said enclosing wall structure defining the storage space, said upper down-draft passage portion and said upper up-draft passage portion being in communication with each other through said second communication aperture for causing hot air circulated by said ventilating means to flow along said up-draft passage and said upper up-draft passage portion separately for being introduced into the storage space defined by said enclosing wall structure through said plurality of hot-air inlet ports successively.

2. A defrosting apparatus as set forth in claim 1, wherein said first communication aperture includes a first space defined between the lower end of said first guide plate and a lower portion of said housing wall structure of said housing, and said second communication aperture includes a second space defined between the lower end of said second guide plate and said partition wall.

3. A defrosting apparatus as set forth in claim 2, wherein said enclosing wall structure defining the storage space includes a pair of laterally spaced plate-like shelf receiving members disposed vertically within said housing and a shield plate connected to said shelf receiving members at respective upper ends thereof, said pair of shelf receiving members support therebetween a plurality of shelf plates in a vertical array for receiving frozen foods placed thereon, and one of said pair of shelf receiving members is provided with on hot-air inlet port of said plurality of hot-air inlet ports for each one of said plurality of shelf plates and the other one of said pair of shelf receiving members is provided with one hot-air outlet port of said plurality of hot-air outlet ports for each one of said plurality of shelf plates.

4. A defrosting apparatus as set forth in claim 3, wherein said second guide plate has an upper end portion connected to said shield plate in a substantially hermetic manner.

5. A defrosting apparatus as set forth in claim 2, further including interrupting means for selectively opening or closing an entry portion of said down-draft passage.

6. A defrosting apparatus as set forth in claim 5, wherein said interrupting means includes a shutter blade member pivotably mounted on an inner wall of said housing wall structure of said housing.

7. A defrosting apparatus as set forth in claim 5, wherein said interrupting means includes a shutter blade member pivotably mounted on said first guide plate at an upper portion thereof for also selectively opening or closing an entry portion of said upper down-shaft passage portion by said shutter blade member.

8. A defrosting apparatus as set forth in claim 2, further including spacer means for causing a size of said up-draft passage to be substantially equal in the transverse direction to said down-draft passage, said upper down-draft passage portion and said upper up-draft passage portion.

9. A defrosting apparatus as set forth in claim 8, wherein said spacer means includes a plate member disposed vertically within said up-draft passage with upper and lower ends thereof being connected in a substantially hermetic manner to said transverse partitioning plate and a lower end of said first guide plate, respectively.

10. A defrosting apparatus as set forth in claim 1, wherein said housing has a thermally insulated structure, and includes an evaporator disposed within said housing.

11. A defrosting apparatus as set forth in claim 1, wherein said ventilating means is provided upstream of said hot-air outlet ports and downstream relative to said heater means.

12. A defrosting apparatus as set forth in claim 2, wherein said ventilating means is provided upstream of said hot-air inlet ports and downstream relative to said heater means.

13. A defrosting apparatus as set froth in claim 1, wherein said heater means comprises an electric heater.

14. A defrosting apparatus as set forth in claim 1, wherein said first communication aperture is defined by the lower end of said first guide plate being spaced from the bottom wall portion of said housing wall structure.

* * * * *